(12) United States Patent
Danielsson et al.

(10) Patent No.: US 6,461,505 B1
(45) Date of Patent: Oct. 8, 2002

(54) DEWATERING DEVICE

(75) Inventors: Magnus Danielsson, Matfors; Jörgen T Lundberg, Sundsvall, both of (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/831,178
(22) PCT Filed: Nov. 4, 1999
(86) PCT No.: PCT/SE99/01978
§ 371 (c)(1),
(2), (4) Date: May 4, 2001
(87) PCT Pub. No.: WO00/28134
PCT Pub. Date: May 18, 2000

(30) Foreign Application Priority Data

Nov. 6, 1998 (SE) .............................................. 9803814

(51) Int. Cl.$^7$ .............................................. B01D 33/06
(52) U.S. Cl. ........................ 210/248; 210/386; 210/402; 100/121; 162/358.1
(58) Field of Search ................................ 210/386, 402, 210/784; 100/248, 110, 116, 121, 122; 162/305–306, 312–315, 318, 357, 358.1 358.3, 251, 261

(56) References Cited

U.S. PATENT DOCUMENTS 3,980,518 * 9/1976 Ljung et al. ................ 162/303

FOREIGN PATENT DOCUMENTS

| EP | 0 354 741 | 2/1990 |
| EP | 0 369 611 | 5/1990 |
| WO | 94/26388 | 11/1994 |
| WO | 96/18495 | 6/1996 |

* cited by examiner

Primary Examiner—Robert J. Popovics
(74) Attorney, Agent, or Firm—Lerner, David, Littenberg, Krumholz & Mentlik, LLP

(57) ABSTRACT

Apparatus is disclosed for dewatering aqueous suspensions including a pair of rotatable rolls forming a nip therebetween, so that the aqueous suspension can pass downwardly through the nip and be dewatered by removing a filtrate from the suspension, and the dewatered suspension can pass downwardly from the nip, at least one of the rolls being liquid permeable, and at least one screen adjacent to the roll and disposed below the nip, the screen is separated from the roll by a predetermined distance and extends along its length, the predetermined distance being a sufficient distance so that a film of filtrate on the roll passes between the roll and upper end of the screen on one side of the screen and the dewatered suspension passes on the other side of the screen so that the filtrate is prevented from contacting the dewatered suspension below the nip.

5 Claims, 2 Drawing Sheets

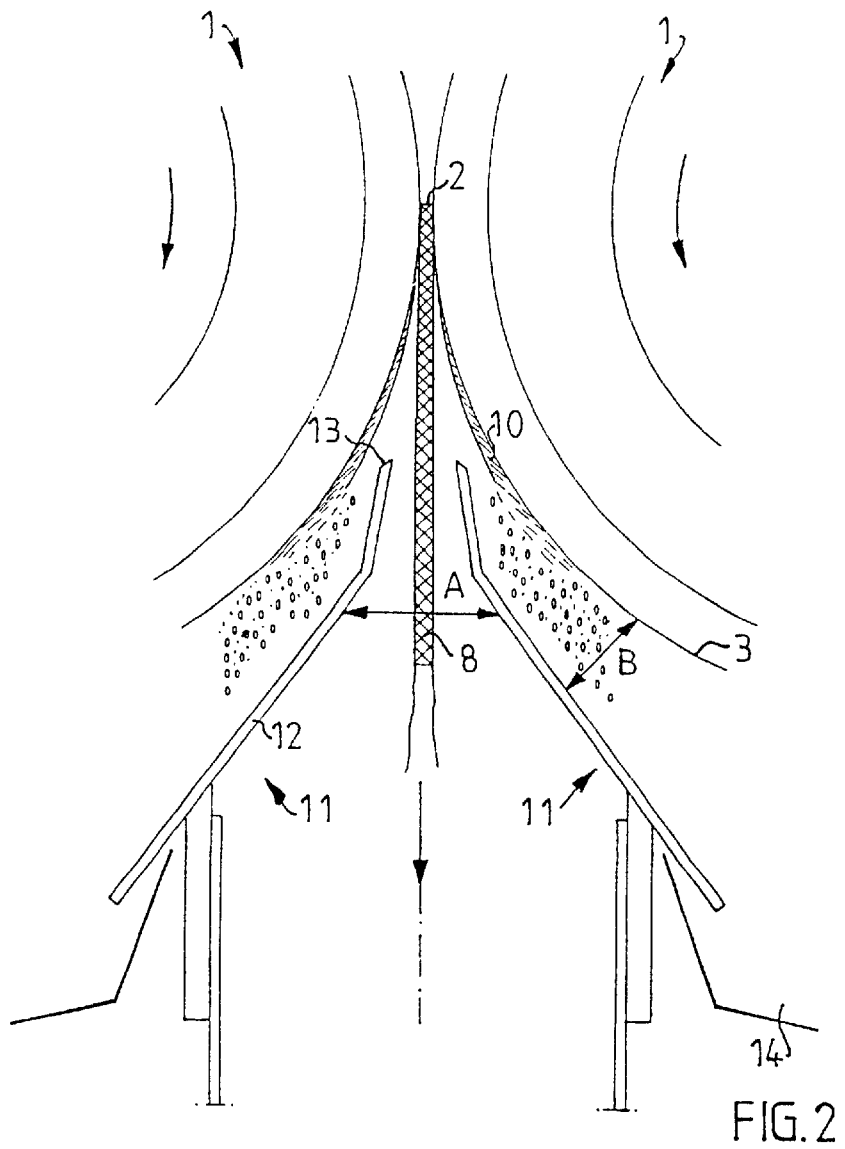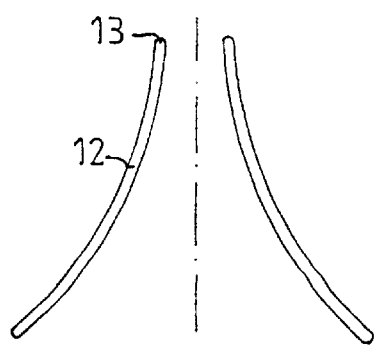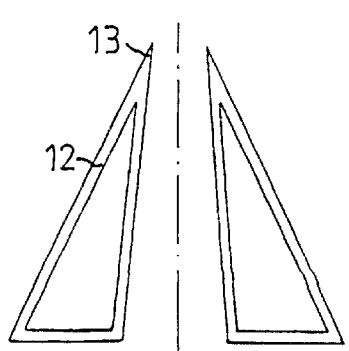
FIG. 2
FIG. 3  FIG. 4

DEWATERING DEVICE

FIELD OF THE INVENTION

The present invention relates to a device for dewatering material suspensions. More particularly, the present invention relates to a device comprising two co-operating cylindrical rotary rolls, where at least one of the rolls is liquid permeable. The rolls form a gap between them, through which the material is intended to pass downwardly from above and simultaneously be dewatered.

The material suspension can, for example, be a pulp suspension, and the dewatering device can be a washing press or a dewatering press.

BACKGROUND OF THE INVENTION

Dewatering devices known in the art are described herein where both rolls are liquid permeable. The rolls are formed with liquid permeable shell surfaces, which consist of a perforated metal sheet attached to a roll body. In order to achieve high capacity, the total open hole area must be substantial, and at the same time the holes must be small, in order to prevent fine material, for example small fibers, from following along with the liquid through the holes. In order to solve these problems, the rolls can be provided with a wire cloth on the outside of the perforated shell metal sheet. The wire cloth allows liquid flow along the shell surface, and usually is formed of plastic wires. This permits the perforations to be designed greater so as to yield a higher capacity without the risk of an increased passage of fine material.

The rolls are normally rotatably mounted on two parallel shafts. The material suspension is supplied to the device so that it is moved by rotation of the rolls downwardly from above through the nip, whereby compression and dewatering of the material to a desired dry matter content takes place.

Below the nip, the transfer of material from the rolls takes place by means of a doctor device and gravity. A doctor blade abuts the shell surface of each roll and extends along the entire length of the roll. The roll can have a length of up to 8 meters. The doctor is intended to ensure transfer of the material from the rolls, and thus mechanically scrapes off the material. When the rolls are covered with wire, the doctors are arranged at a small distance, usually from about 0.1 to 0.5 mm, from the roll so that the doctors do not damage the wire cloth.

A dewatering device of this kind is described, for example, in the Swedish patent specification No. 504,011.

When only one of the rolls is liquid permeable, it is designed as described above and, consequently, has one doctor device for transferring the material. The roll, which is not liquid permeable, is in this case primarily provided to render the formation of a nip possible.

During such dewatering problems arise with wear and deflection of the doctors. The requirements on the doctors are greater, and the doctors must abut the roll without the force between doctor and roll being so great that the doctor and roll are subjected to high mechanical stresses. In spite of highly accurately designed and rigid doctor devices, problems nevertheless arise with wear of both the doctors and the rolls. Due to such wear, the doctors must be exchanged often. They are also quite expensive with regard to their construction and manufacture. Wear of the rolls results in deterioration of their function and shortening of their life.

When the roll is covered with a wire, it is desired to maintain a space of tenths of a millimeter between the doctor and the wire. This is not made easier by the fact that the doctors get worn, and in certain cases problems arise because the wire is damaged by the doctors.

During dewatering with devices of these types, there also arise problems because of the re-wetting of the dewatered material. When the dewatered material leaves the nip, the compressing force decreases. Pressed-off liquid (filtrate) can then run back through the perforated metal sheet and re-wet the material, whereby the washing result and dry matter content are deteriorated.

Experiments have shown that the filtrate running back after the nip preferably deposits as a liquid film on the roll. The liquid film then follows along with the roll in its rotation. The doctor, which generally abuts the roll, scrapes off this film so that it follows along with the dewatered material and re-wets the same.

SUMMARY OF THE INVENTION

In accordance with the present invention, these and other difficulties have been overcome by the invention of apparatus for dewatering aqueous suspensions comprising a pair of rotatable rolls juxtaposed with each other to form a nip therebetween, whereby the aqueous suspension can pass downwardly through the nip and be dewatered by removing a filtrate from the aqueous suspension and the dewatered suspension can pass downwardly from the nip, at least one of the pair of rotatable rolls being liquid permeable whereby a film of the filtrate forms on the at least one of the pair of rotatable rolls below the nip, and at least one screen adjacent to the at least one of the pair of rotatable rolls disposed below the nip and having a first side facing the at least one of the pair of rotatable rolls and a second side facing away from the at least one of the pair of rotatable rolls, the screen including an upper end proximate to the at least one of the pair of rotatable rolls and separated from the at least one of the pair of rotatable rolls by a predetermined distance and extending along its length, the predetermined distance being a sufficient distance whereby the film of the filtrate passes between the at least one of the pair of rotatable rolls and the upper end of the screen on the first side of the screen and the dewatered suspension passes on the second side of the screen so that the filtrate is prevented from contacting the dewatered suspension below the nip. In a preferred embodiment, each of the pair of rotatable rolls is liquid permeable, and the apparatus includes a pair of the screens disposed below the nip adjacent to each of the pair of rotatable rolls. Preferably, the distance separating the pair of screens from each other increases in a direction away from the nip.

In accordance with one embodiment of the apparatus of the present invention, the predetermined distance is between 1 and 100 mm.

In accordance with another embodiment of the apparatus of the present invention, the distance between the at least one of the pair of rotatable rolls and the screen increases in a direction moving away from the nip.

In accordance with the present invention, a screen device is arranged so that the distance between the screen device and the roll is of a magnitude such that the liquid film on the roll passes between the screen device and the roll, thereafter without coming into contact with the dewatered material, runs down into a filtrate collecting means.

According to the present invention, re-wetting of the dewatered material is reduced considerably. Due to the fact that the doctor is removed, the mechanical effect between roll and doctor, and thus all of the costs in connection with the exchange of worn doctors, are thereby eliminated. The risk of damage of the wire cloth or roll is also eliminated.

In addition, the requirements for accuracy of the design of the screen device and its rigidity are much lower than in the case with a doctor device, because the screen device is located at a relatively great distance from the roll. The present invention, therefore, results in a reduction of the costs related to construction and manufacture compared to the use of the doctor device.

By thus utilizing apparatus according to the present invention, the dry matter content of pulp can be increased from 2.5 to 8% to 20 to 40%, preferably from 3 to 8% to 30 to 35%.

BRIEF DESCRIPTION OF THE DRAWINGS

The present invention is described in greater detail below with reference to the detailed description, which, in turn, refers to the accompanying drawings illustrating an embodiment of the present invention, as follows.

FIG. 2 is a side, elevational, partial, enlarged view of the screen device used according to FIG. 1, FIG. 3 is a side, elevational, partial, enlarged view of another embodiment of a screen device used in connection with the present invention, and FIG. 4 is a side, elevations, partial, enlarged view of another embodiment of a screen device used in connection with the present invention.

DETAILED DESCRIPTION

Figure 1:
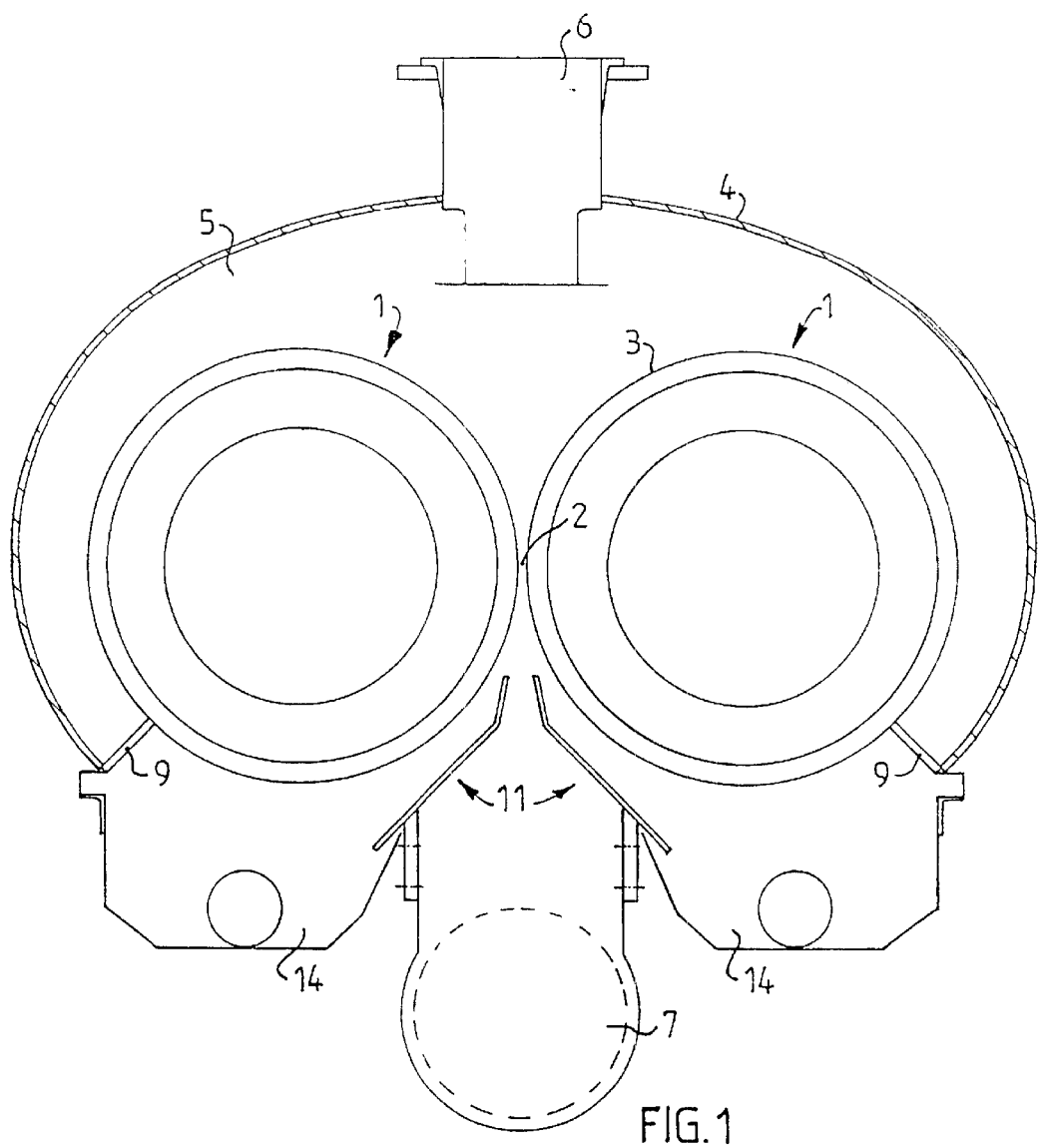
FIG. 1 is a side, elevational, cross-sectional view of a dewatering device according to the present invention.

The device shown in FIG. 1 comprises two co-operating cylindrical rotary liquid permeable press rolls 1, which between them form a press nip 2. For controlling the size of the nip 2, at least one of the rolls 1 is adjustable. The shell surface of the rolls 1 consists of a liquid permeable shell 3, preferably a perforated metal sheet, with or without wire cloth, which is attached to a roll body. The upper part of the rolls 1 is surrounded by a casing 4, so that a space 5 is formed above the rolls 1. At least one inlet 6 is connected to the casing 4 for supply of the material suspension. In the space 5 a higher pressure is maintained than in and below the rolls 1. The pressure preferably is brought about by a pump, which feeds the material suspension to the space 5.

Due to the overpressure in the space 5, liquid is pressed from the material suspension into the roll 1. The liquid is pressed through the liquid permeable shell surface 3, and at the same time the material deposits on the surface of the shell surface 3. The material is then moved by rotation of the rolls 1 through the nip 2, where it is dewatered to a dry matter content which depends, for example, on the properties of the material and on the force applied on the pulp web. After the nip 2 the dewatered material is transferred from the rolls by gravity. The material should thus have such a dry matter content that it leaves the rolls 1. This is facilitated if the material after the nip 2 forms a coherent material web 8. The weight of the material web 8 assists in drawing with the subsequent material web 8. When the material suspension is a pulp suspension, the dry matter content after the nip should be above about 20% so that the material forms a coherent material web 8.

After the nip 2 the material drops down into a transport means 7, for example a tearing screw.

The space 5, in order to be put under over-pressure, is sealed from the ambient by sealings 9 against the shell surfaces of the rolls 1 and sealings (not shown) against the end walls of the rolls. Between the rolls 1 the material web 8 in the nip 2 acts as a seal.

Part of the liquid (filtrate), which has been pressed out of the material suspension and in through the liquid permeable shell surface 3 of the roll 1 runs back after the nip 2 and forms a liquid film 10 of filtrate on the roll 1. The filtrate liquid film 10 follows for some distance along in the rotation of the roll 1 and thereafter leaves the roll 1, and drops down, as shown in FIG. 2.

Below the nip 2, for each roll 1 at least one screen device 11 is located. Every screen device comprises a screen 12, which extends along the entire length of the roll 1, its uppermost portion 13 being located closest to the roll 1. The screen device 11 can comprise several screens 12, which are arranged so that they together extend along the entire length of the roll. Every screen device 11 and its screen is adjustable for adjusting its position in relation to the roll 1.

The screen 12 is arranged so that the uppermost portion 13 of the screen is at a distance from the roll 1 such that the filtrate liquid film 10 passes between the roll 1 and screen in such a way that the uppermost portion 13 of the screen does not significantly come into contact with the filtrate liquid film 10. The dewatered material/material web 8 passes on that side of the uppermost portion 13 of the screen which is the other side of the filtrate liquid film 10. This is shown in FIG. 2. If the uppermost portion 13 of the screen comes into contact with the filtrate liquid film 10 on the roll 1, the filtrate liquid film 10 can leave the roll 1 earlier than it would have left if it would have followed along undisturbed in rotation of the roll 1. The filtrate liquid film 10 can in this case leave the roll before it has passed in between the uppermost portion 13 of the screen and roll 1, and then pass on the same side of the screen 12 as the dewatered material and, thus, re-wet the same.

The filtrate liquid film 10 is thinnest closest to the nip 2 and increases in thickness farther away from the nip. This implies that the farther upward to the nip the screen 12 is located, the closer to the roll the screen 12 can be located.

The screen 12 is located so that the filtrate liquid film 10 passes in between the uppermost portion 13 of the screen and roll 1 before the filtrate liquid film 10 leaves the roll 1. The filtrate is thereafter led down into a filtrate collecting means 14 without coming into contact with the dewatered material. This is preferably done by means of the screen device 11, for example by the screen 12 extending a distance down into the filtrate collecting means 14, as shown in FIG. 2.

When the dewatered material/material web 8 after the nip 2 drops down to the transport means 7, it passes the screen 12, which is designed and located so that the material/material web 8 passing therebetween does not stop in its falling movement in such a way that a material plug is formed. The material thus substantially freely falls downward between the screens 12. The distance A between the screens 12 must therefore be at least constant, but preferably increases with the distance from the nip 2. The surface of the screen 12 toward the material is preferably formed so as to offer as little frictional resistance as possible. The screen 12 is also designed and located so that the filtrate passing between the roll 1 and its screen 12 is not stopped. The distance B between the roll 1 and its screen 12, thus, preferably should increase with the distance from the nip 2.

The material web 8 can deviate slightly to the screens 12. In order to prevent the material web from moving in between the roll 1 and its screen 12, in this case the uppermost portion 13 of the screen should be located as close to the roll 1 as possible, paying regard to the thickness of the filtrate liquid film 10. Furthermore, at the start-up of a dewatering device according to the present invention the dry matter content of the material after the nip 2 can be so low that the material does not leave the roll 1, and a material web 8 is thus not formed instantly. The material can then be thrown into different directions due to the rotation of the rolls 1, and also follow along with the rolls in their rotation. If it is desired to minimize the amount of material which at the start passes between the screen 12 and roll 1, the uppermost portion 13 of the screen should also be located as close as possible to the roll 1, regard being paid to the thickness of the filtrate liquid film 10.

The position of the screens in relation to the rolls 1 and nip 2 is an optimization of the distance between the screens 12, paying regard, for example, to where the filtrate liquid film 10 leaves the roll 1, the thickness of the filtrate liquid film 10 and the way in which the material behaves after the nip 2.

The distance between the roll 1 and uppermost portion 13 of its screen can be from 1 to 100, but preferably from 5 to 30 mm.

The screen 12 in FIG. 2 has an angled profile, but the screen can also be formed in different ways. Two other examples of the configuration of the screens 12 are shown in FIGS. 3 and 4 in which FIG. 3 shows a screen with curved profile, and FIG. 4 shows a screen with hollow wedge-shaped profile.

The uppermost portion 13 of the screen is preferably designed so as to prevent deposited material from accumulating and building-up on that portion. A build-up of material on the uppermost portion 13 of the screen can, in the worst case, result in the formation of a plug. The risk thereof is greatest in connection with the start-up of the dewatering device. A suitable configuration of the uppermost portion 13 of the screen is the one shown in FIG. 2. It is in that case bevelled, and deposited material is thus possibly led away with the filtrate. The uppermost portion 13 of the screen can also, for example, be rounded, as in FIG. 3, or sharp, as in FIG. 4.

The dewatering device can also, for example, comprise two rolls, of which only one is liquid permeable. The roll which is not liquid permeable, can in this case have a considerably smaller diameter than the liquid permeable roll. A screen device is in this case provided only for the liquid permeable roll.

The present invention can also be used in a device intended for washing a material suspension. The material suspension in that case is treated after the nip in the aforesaid manner, but before the nip, for example, forms a web on the liquid permeable roll or rolls, to which web washing liquid is supplied.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. Apparatus for dewatering material suspensions comprising a pair of rotatable rolls juxtaposed with each other to form a nip there between, whereby said material suspension can pass downwardly through said nip and be dewatered by removing a filtrate from said material suspension and said dewatered suspension can pass downwardly from said nip, at least one of said pair of rotatable rolls being liquid permeable whereby a film of said filtrate forms on said at least one of said pair of rotatable rolls below said nip, and at least one screen adjacent to said at least one of said pair of rotatable rolls disposed below said nip and having a first side facing said at least one of said pair of rotatable rolls and a second side facing away from said at least one of said pair of rotatable rolls, said screen including an upper end proximate to said at least one of said pair of rotatable rolls and separated from said at least one of said pair of rotatable rolls by a predetermined distance and extending along its length, said predetermined distance being a sufficient distance whereby said film of said filtrate passes between said at least one of said pair of rotatable rolls and said upper end of said screen on said first side of said screen and said dewatered suspension passes on said second side of said screen so that said filtrate is prevented from contacting said dewatered suspension below said nip.

2. The apparatus of claim 1, wherein each of said pair of rotatable rolls is liquid permeable, and including a pair of said screens disposed below said nip adjacent to each of said pair of rotatable rolls.

3. The apparatus of claim 2, wherein the distance separating said pair of screens from each other increases in a direction away from said nip.

4. The apparatus of claim 1, wherein said predetermined distance is between 1 and 100 mm.

5. The apparatus of claim 1, wherein said distance between said at least one of said pair of rotatable rolls and said screen increases in a direction moving away from said nip.

\* \* \* \* \*